United States Patent
Dieckmann et al.

(10) Patent No.: US 6,644,105 B2
(45) Date of Patent: Nov. 11, 2003

(54) PROCESS FOR IMPROVED DETERMINATION OF THE RATIO AMONG THE RADII OF THE WHEELS OF A VEHICLE

(75) Inventors: Thomas Dieckmann, Pattensen (DE); Arne Michaelsen, Honnover (DE)

(73) Assignee: Wabco GmbH & Co. OHG, Hannover (DE)

(*) Notice: Subject to any disclaimer, the term of this patent is extended or adjusted under 35 U.S.C. 154(b) by 154 days.

(21) Appl. No.: 09/844,039

(22) Filed: Apr. 27, 2001

(65) Prior Publication Data

US 2001/0054310 A1 Dec. 27, 2001

(30) Foreign Application Priority Data

May 17, 2000 (DE) .......................................... 100 24 178

(51) Int. Cl.[7] .............................................. G01M 17/02
(52) U.S. Cl. ...................................................... 73/146
(58) Field of Search ................................ 73/146–146.8; 701/1, 2, 83, 70, 19, 38; 340/442, 444, 3

(56) References Cited

U.S. PATENT DOCUMENTS

| 5,583,483 | A | * | 12/1996 | Baumann | ..................... | 340/444 |
| 6,092,415 | A | * | 7/2000 | Borenius et al. | ........... | 73/146.2 |
| 6,366,833 | B1 | * | 4/2002 | Fukuyama | ..................... | 701/1 |

FOREIGN PATENT DOCUMENTS

| DE | 4327492 | 2/1995 |
| DE | 9807880 | 9/1999 |

OTHER PUBLICATIONS

F. Gustafson, "Estimation and Change Detection of Tire—Road Friction Using the Wheel Slip," in *Proc. of CCA, 1996*.

Fredrik Gustafsson, Nov. 28, 1996, "Slip–Based Tire–Road Friction Estimation".

Heiko Grunberg "Untersuchung des Radradienverhaltnisses und des Schlupfaufkommens als Beitrag zur Fahrsicherheit," in *Fortschritt–Berichte VDI*, vol. 12, No. 378, pp. 1–21 (1999).

Helmut Mayer, "Reifendrucküberwachung anhand von Raddrehzahlsignalen," in *Fortschritt–Berichte VDI*, vol. 12, No. 274, pp. 10129 (1996).

* cited by examiner

*Primary Examiner*—Hezron Williams
*Assistant Examiner*—Marissa L Ferguson
(74) *Attorney, Agent, or Firm*—Proskuer Rose LLP

(57) ABSTRACT

A process for determining the wheel radius ratios of a vehicle equipped with an anti-lock braking system uses the rotational speeds of the vehicle wheels to determine a vehicle drive slip value. This drive slip value and the driving force of the vehicle drive wheels are combined in a Kalman filter to compute the wheel radius ratio data. When traveling around curves, however, the drive slip value calculation can become inaccurate, thereby corrupting the computed wheel radius ratio data. To correct for this curve travel effect, the inventive process includes the yawing rate of the vehicle in its computations. As a result, the corrected wheel radius ratios can be more reliably used for detecting tire pressure problems.

13 Claims, 3 Drawing Sheets

PROCESS FOR IMPROVED DETERMINATION OF THE RATIO AMONG THE RADII OF THE WHEELS OF A VEHICLE

BACKGROUND OF THE INVENTION

The invention relates to a process for improving the determination of the wheel radius ratios in a vehicle. In particular, the invention relates to the improved determination of wheel radius ratios for the purpose of detecting an unacceptable tire pressure.

A prior art process for the detection of unacceptable tire pressure is disclosed in German patent document 43 27 492 C1 (U.S. Pat. No. 5,583,483), incorporated herein by reference.

In the prior art, vehicles having an anti-lock braking system typically use a rotational-speed sensing device. This sensing device is usually installed in the proximity of each wheel, and consists of a toothed magnet wheel with an electromagnetic clocking device attached to the wheel suspension. The rotational-speed of the wheel can then be determined directly by means of this sensing device, and the wheel speed can be determined indirectly from the wheel radius.

In evaluating the rotational-speed signals of a vehicle's wheels within the framework of regulating or warning functions, the rotational-speed signals are compared with each other to detect e.g., a slip regulation, or a tire pressure warning. However, when the vehicle is traveling around a curve, there is a difference between rotational-speed signals that should not be used to trigger the regulating or warning functions. This difference in rotational-speed signals, due to traveling around a curve, is not easily distinguishable from the difference in rotational-speed signals caused by wheel slip, or by changes in tire pressure. In the prior art, this problem is typically circumvented by setting a predetermined curve travel limit value, which effectively removes the curve-related rotational speed factor from the process.

Therefore, it is an object of the present invention to improve the process for determining the ratios between the radii of vehicle wheels (the wheel radius ratio), so that they can be used during curve travel, as well as normal travel, without any of the prior art limitations.

SUMMARY OF THE INVENTION

This object is attained by the inventive process, as follows:

a) measuring a rotational-speed of each wheel of the vehicle, b) calculating an angular velocity for each wheel of the vehicle, based on the rotational-speed measurements, c) measuring a vehicle movement signal, d) calculating a yawing rate for the vehicle, based on the vehicle movement signal measurement, e) calculating a drive slip for each side of the vehicle, based on the corresponding angular velocities and the yawing rate, where the drive slip calculation uses the yawing rate to compensate for curve travel effects, and f) determining the wheel radius ratios, based on the calculated drive slip signal and a driving force signal received from the vehicle.

The inventive process requires only one vehicle movement signal for the calculation of curve travel compensation, and this movement signal can be obtained from a sensor, which is typically present in vehicles having travel dynamics regulating systems. As such, curve travel compensation can be achieved through computation alone, and can be applied in practice without additional cost.

A yawing rate sensor is preferably used to determine the vehicle movement signal. In an alternative embodiment of the invention, however, a steering angle sensor and/or a transverse acceleration sensor can be used. The yawing rate of a vehicle can also be determined in accordance with German patent document 198 17 686 A1 (U.S. Pat. No. 6,092,415) (incorporated herein by reference), by using the signals from these sensors and the vehicle speed. If several of the above-mentioned sensors are available, their output signals can be used for a mutual plausibility check.

Once the wheel radius ratios are determined accurately, including curve travel compensation, they are monitored continuously, so that a predetermined amount of change in ratios attributable to one of the wheels indicates an unacceptable tire pressure in that wheel.

BRIEF DESCRIPTION OF THE DRAWINGS

The invention is described in greater detail below through the example of embodiments shown in the drawings, wherein.

For clarity, the same reference number designations are used in FIGS. 1–4.

DETAILED DESCRIPTION OF PREFERRED EMBODIMENTS OF THE INVENTION

Figure 1:
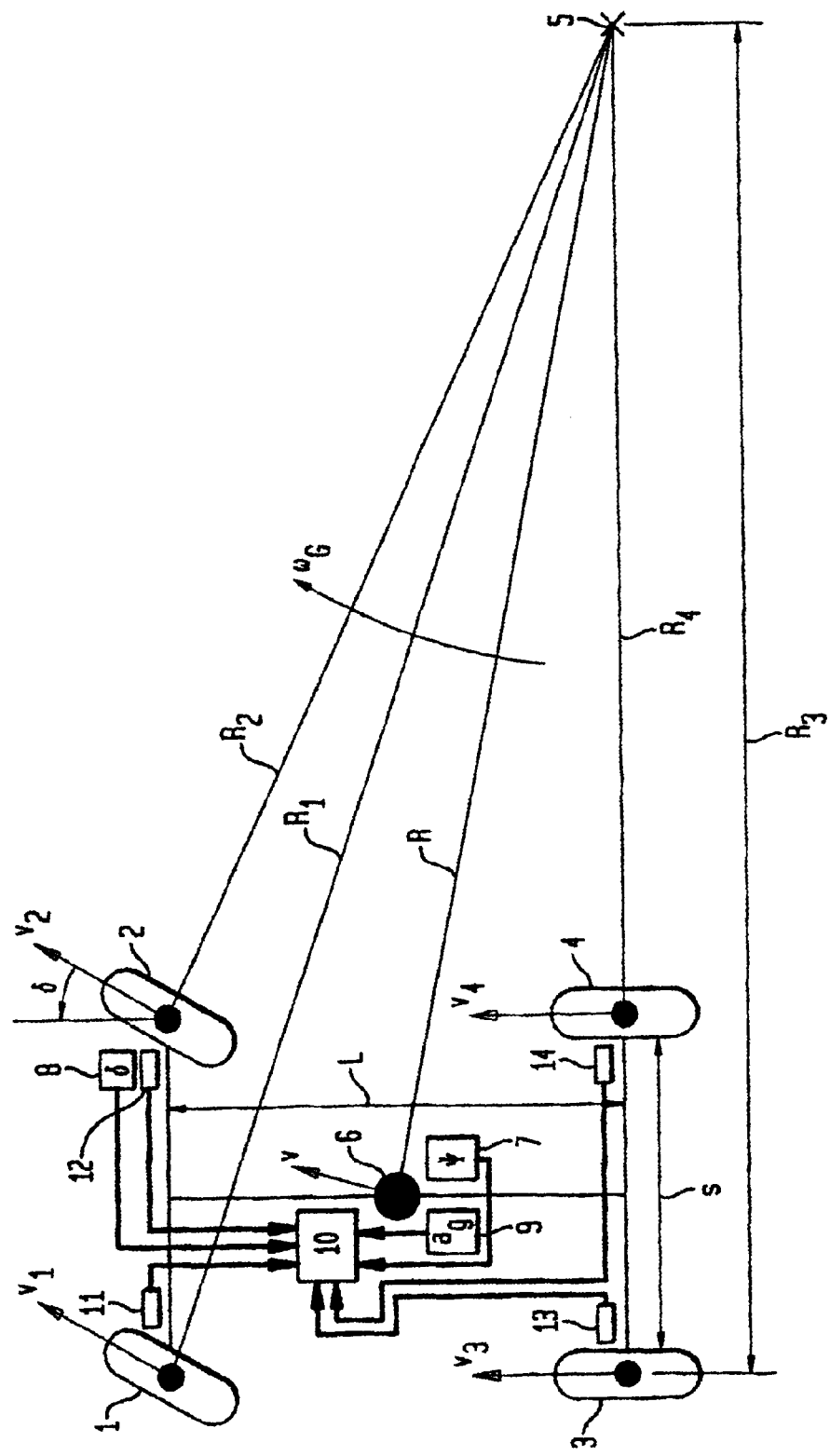
FIG. 1 shows a top view schematic of a four-wheel vehicle.

In FIG. 1, only those vehicle parts needed to explain the invention are identified, in addition to the appertaining physical dimensions. The vehicle is shown to have four wheels 1, 2, 3, 4, with corresponding speeds of $V_1$, $V_2$, $V_3$, $V_4$, relative to a point 5. As shown in FIG. 1, the vehicle is traveling in a curve to the right. The vehicle's center is denoted as 6, and it moves at a speed V relative to point 5. A yawing rate sensor 7 is installed, preferably near the vehicle center 6, which transmits a vehicle movement signal $\dot{\psi}$ to an electronic control device 10. In addition, the electronic control device 10 receives signals from rotational-speed sensors 11, 12, 13, 14, which are installed near the wheels 1, 2, 3, 4, respectively. The electronic control device 10 also receives vehicle movement signals $\delta$ and $a_q$ from a steering angle sensor 8 and a transverse acceleration sensor 9, respectively.

Figure 2:
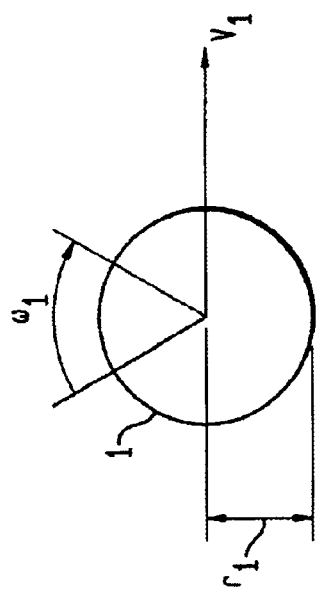
FIG. 2 shows a wheel diagram of the vehicle in FIG. 1.

The rotational-speed signals are converted into angular velocities $\omega_1$, $\omega_2$, $\omega_3$, $\omega_4$ in the electronic control device 10. The interrelationship of the angular velocities $\omega_1$, $\omega_2$, $\omega_3$, $\omega_4$, the wheel radii $r_1$, $r_2$, $r_3$, $r_4$, and the wheel speeds $V_1$, $V_2$, $V_3$, $V_4$, is depicted in FIG. 2 for wheel 1. For the case of slip-free movement, the angular velocity of a wheel multiplied by the wheel radius equals wheel speed. Therefore, this relationship for wheel 1 is:

$$V_1 = \omega_1 \cdot r_1 \qquad [1]$$

Referring again to FIG. 1, the electronic control device 10 receives the signal $\dot{\psi}$ from the yawing rate sensor 7, the signal δ from the steering angle sensor 8, and the signal $a_q$ from the transverse acceleration sensor 9, and computes a yawing rate $\omega_G$, in conjunction with the vehicle speed V.

The geometrical dimensions R, $R_1$, $R_2$, $R_3$, $R_4$, L, and S are defined in FIG. 1. The dimension R represents the distance between the vehicle center 6 and point 5, and $R_1$, $R_2$, $R_3$, $R_4$ represent the distances between the centers of the wheels 1, 2, 3, 4, respectively, and point 5. The dimension S represents the wheel gauge, and the dimension L represents the wheel base of the vehicle.

Figure 3:
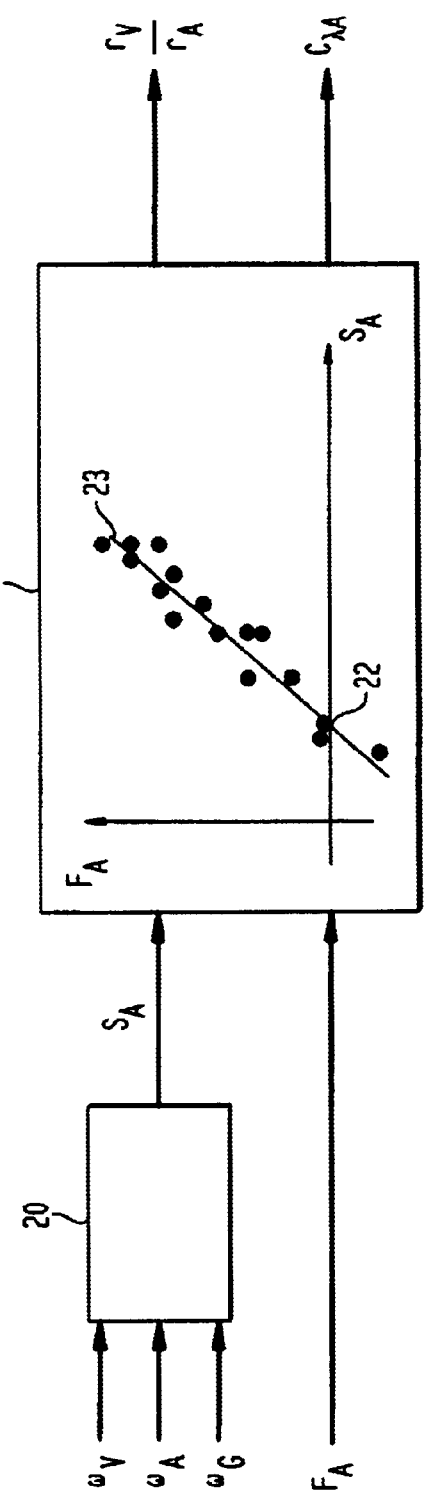
FIG. 3 shows a preferred embodiment of the present invention in block diagram form.

FIG. 3 shows the parameters used to determine a wheel radius ratio $r_v/r_A$, between the front wheel 1, 2 and the rear wheel 3, 4 (FIG. 1). For this purpose, a Kalman filter 21 is employed, as is well known in the art. The Kalman filter uses the drive slip $S_A$ of a drive wheel 3 or 4, in relationship to a non-drive wheel 1 or 2, and also a driving force signal $F_A$, for its computation. Furthermore, a tire rigidity factor $c_{\lambda A}$ is determined by the Kalman filter, which enables the calculation of the frictional behavior of a tire on its current road surface The utilization of a Kalman filter for such purposes is explained in detail in the following publications:

Heiko Grünberg, "Untersuchung des Radienverhältnisses . . . , " Fortschritt-Berichte VDI, Vol. 12, No. 378.

Fredrik Gustafsson, "Estimation and Change Detection of Tire-Road Friction Using the Wheel Slip."

Fredrik Gustafsson, "Slip-Based Tire-Road Friction Estimation," Nov. 28 1996.

Illustratively, the driving force signal $F_A$ can be transmitted from an electronic engine control system via a data bus system to the electronic control device 10.

In the prior art, the drive slip $S_A$ is determined from the angular velocities $\omega_V$ of a front wheel, and $\omega_A$ of a drive wheel, but with no correction factor for curve travel effects. In the inventive process, however, the computing step provided in block 20 of FIG. 3, to be described below, takes into account the yawing rate $\omega_G$, which is used to eliminate the influence of curve travel on the drive slip $S_A$.

In a preferred embodiment of the present invention, as shown in FIG. 3, the drive slip $S_A$ is computed in block 20 in accordance with the following equation:

$$S_A = \frac{\omega_A}{\omega_V} \cdot \frac{r_A}{r_V} \cdot \sqrt{\frac{1}{1 - \frac{L^2}{r_V^2} \cdot \frac{\omega_G^2}{\omega_V^2}}} - 1 \qquad [2]$$

As such, the drive slip $S_A$ of one side of the vehicle is computed without any limitations for curve travel. This computation step (block 20) and the Kalman filtering step (block 21) are therefore carried out twice, in the manner of a sub-program. The angular velocities $\omega_1$, $\omega_3$ and the driving force signal $F_3$ are used to calculate the values $S_3$, $r_1/r_3$, $c_{\lambda 3}$ for the left side of the vehicle, while the angular velocities $\omega_2$, $\omega_4$ and the driving force signal $F_4$ are used to calculate the values $S_4$, $r_2/r_4$, $c_{\lambda 4}$ for the right side of the vehicle.

Using these calculated results, the drive slip values of the left and right drive wheels can be corrected for the so-called zero-slip portion, and will be designated as $S_{3corr}$ and $S_{4corr}$, respectively. The zero-slip portion corresponds to the drive slip value at driving force zero, and is represented in FIG. 3 by the zero position 22 of the straight equalization line 23 of the Kalman filter 21. Furthermore, the zero slip share is defined as the wheel radius ratio of the same vehicle side, so that the corrected slip values $S_{3corr}$, $S_{4corr}$ can be determined as follows:

$$S_{3corr} = S_3 - r_1/r_3 \qquad [3]$$

$$S_{4corr} = S_4 - r_2/r_4 \qquad [4]$$

In another embodiment of the present invention, the wheel radius ratios of the wheels of one axle are determined as follows, using the previously found results and additional geometric vehicle data:

Front axle:

$$\frac{r_1}{r_2} = \frac{\omega_2}{\omega_1} \cdot \sqrt{1 + \frac{\omega_G^2}{\omega_2^2} \cdot \frac{S}{r_2^2} \cdot \left(S + 2 \cdot \sqrt{\frac{\omega_2^2}{\omega_G^2} \cdot r_2^2 - L^2}\right)} \qquad [5]$$

Rear axle:

$$\frac{r_3}{r_4} = \frac{\omega_4}{\omega_3} \cdot \left(1 + \frac{\omega_G}{\omega_4} \cdot \frac{S}{r_4} \cdot (S_{4corr} + 1)\right) \cdot \frac{1}{1 - \frac{S_{3corr} - S_{4corr}}{S_{3corr} + 1}} \qquad [6]$$

Figure 4:
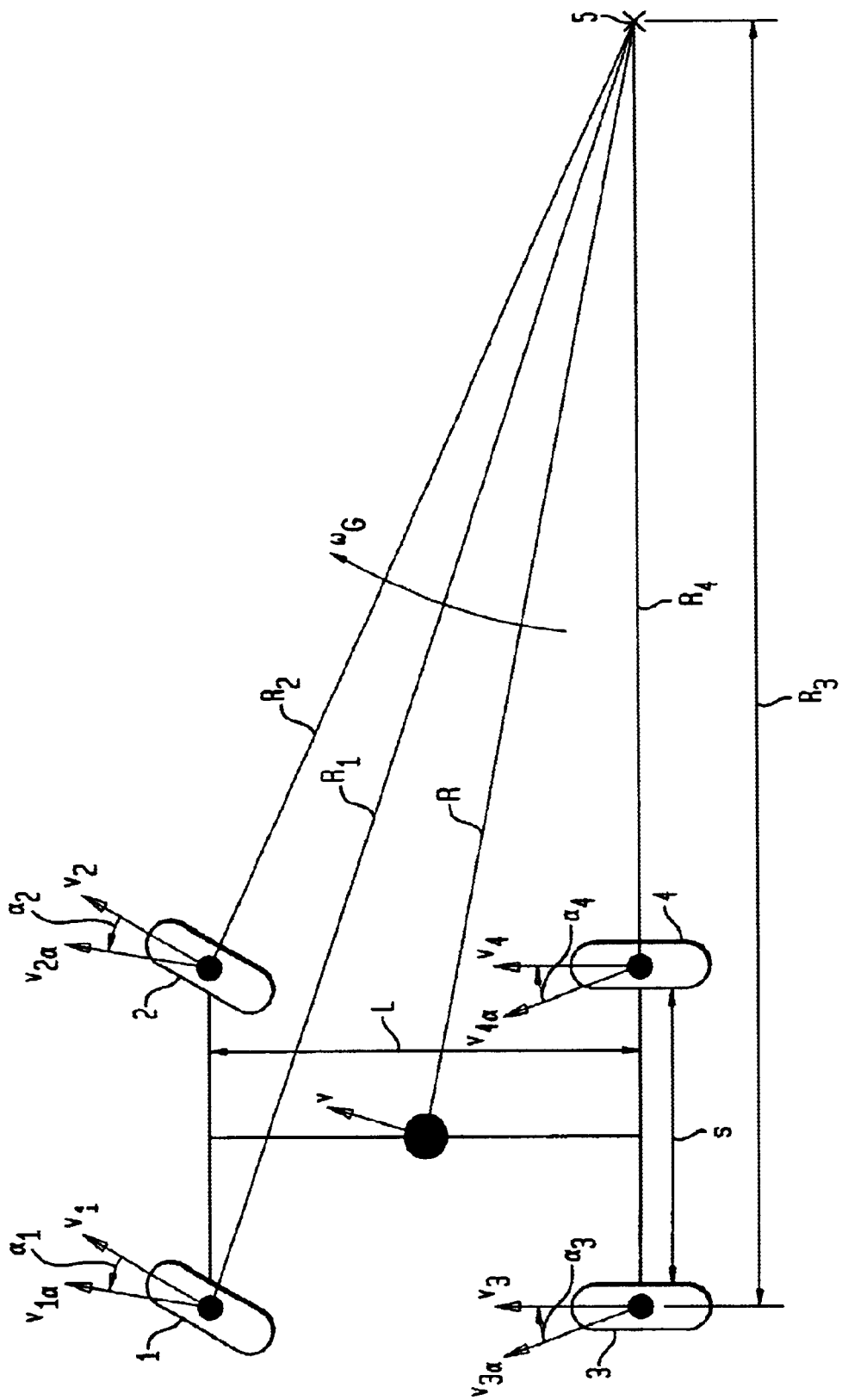
FIG. 4 shows an expanded representation of the vehicle in FIG. 1.

In yet another embodiment of the present invention, the slip angles $\alpha_1$, $\alpha_2$, $\alpha_3$, $\alpha_4$, as shown in FIG. 4, are also taken into account for the calculation of the drive slip $S_A$. This results in a further improvement in precision of the wheel radius ratio calculations. The slip angle of a wheel is defined as the angular deviation of a wheel from its theoretical slip-free behavior. That is, the slip angle is a measure of the lateral slip of a wheel. Therefore, the slip angles $\alpha_1$, $\alpha_2$, $\alpha_3$, $\alpha_4$ can be used to improve the calculation of the drive slip $S_A$ in accordance with the following equation:

$$S_A = \frac{r_A \cdot \omega_A \cdot \cos\alpha_V}{r_V \cdot \omega_V \cdot \cos\left(\arcsin\left(\frac{L}{r_V} \cdot \frac{\omega_G}{\omega_V} \cdot \cos\alpha_A \cdot \cos\alpha_V\right) - \alpha_A\right)} - 1 \qquad [7]$$

Equation [7] can be used advantageously in block 20 of FIG. 3, as an alternative to Equation [2]. As such, Equation [7] would also be executed in the manner of a sub-program; i.e., once for the left vehicle side, and once for the right vehicle side.

A program is provided in the control device 10 to monitor the calculated wheel radius ratios $r_1/r_2$, $r_1/r_3$, $r_2/r_4$, $r_3/r_4$ continuously. If there is a characteristic change in the ratio between one wheel and the other wheels, an unacceptable tire pressure is recognized, and a warning signal is generated. This warning signal may be implemented, illustratively, by a light within the driver's field of vision. The characteristic wheel ratio change referred to above can be recognized, preferably, when a predetermined threshold value is exceeded, as will be explained in the following example.

If it is assumed that the tire pressure becomes unacceptably low on the right rear wheel 4, possibly due to tire damage, the radius $r_4$ decreases, while no significant changes occur in the radii $r_1$, $r_2$, $r_3$. The control device 10 then recognizes this situation when the increase in wheel radius ratio $r_2/r_4$ on the right vehicle side, as well as the increase in wheel radius ratio $r_3/r_4$ on the rear axle, exceed the aforementioned threshold value. At the same time, the wheel radius ratios $r_1/r_2$, $r_1/r_3$ remain essentially unchanged.

In short, an improved process for determining the wheel radius ratios of a vehicle recognizes a tire pressure problem reliably and economically.

While the invention has been described by reference to specific embodiments, this was for purposes of illustration only and should not be construed to limit the scope of the invention. Numerous alternative embodiments will be apparent to those skilled in the art.

What is claimed is:

1. A process for determining a wheel radius ration for a vehicle, including compensation for curve travel, comprising the following steps:
   a) measuring a rotations-speed of each wheel of said vehicle,
   b) calculating an angular velocity for each wheel of said vehicle, based on said rotational speed measurements,
   c) measuring a vehicle movement signal,
   d) calculating a yawing rate for said vehicle, based on said vehicle movement signal measurement,
   e) calculating a drive slip for each side of said vehicle, based on corresponding said angular velocities and said yawing rate, wherein said drive slip calculation uses said yawing rate to compensate for curve travel effects, and
   f) determining said wheel radius ratios, based on said calculated drive slip signal and said vehicle movement signal received from said vehicle.

2. The process of claim 1, wherein said vehicle movement signal is derived from a yawing rate sensor.

3. The process of claim 1, wherein said vehicle movement signal is derived from a steering angle sensor.

4. The process of claim 1, wherein said vehicle movement signal is derived from a transverse acceleration sensor.

5. The process of claim 1, wherein said wheel radius ratio of a front wheel and a rear wheel on the same side of said vehicle is determined by means of a Kalman filter.

6. The process of claim 1, wherein said calculation of said drive slip, with compensation for curve travel, is in accordance with the following equation:

$$S_A = \frac{\omega_A}{\omega_A} \cdot \frac{r_A}{r_V} \cdot \sqrt{\frac{1}{1 - \frac{L^2}{r_V^2} \cdot \frac{\omega_G^2}{\omega_V^2}}} -$$

wherein $S_A$ is the drive slip,
   $\omega_V$ and $r_V$ are the angular velocity and radius, respectively, of a front wheel of said vehicle,
   $\omega_A$ and $r_A$ are the angular velocity and radius, respectively, of a rear wheel of said vehicle,
   L is the wheel base dimension of said vehicle, and
   $\omega_G$ is the yawing rate of said vehicle.

7. The process of claim 6, wherein said drive slip calculation can be corrected for a zero-slip portion of said rear wheels, in accordance with the following equation:

$$S_{Acorr} = S_A - r_A/r_V$$

wherein $S_{Acorr}$ is the corrected value of said drive slip for a corresponding rear wheel.

8. The process of claim 1, wherein a wheel radius ratio of the wheels on the front axle of said vehicle is calculated in accordance with the following equation:

$$\frac{r_1}{r_2} = \frac{\omega_2}{\omega_1} \cdot \sqrt{1 + \frac{\omega_G^2}{\omega_2^2} \cdot \frac{S}{r_2^2} \cdot \left(S + 2 \cdot \sqrt{\frac{\omega_2^2}{\omega_G^2} \cdot r_2^2 - L^2}\right)}$$

wherein $r_1$ and $r_2$ are the radii of the left and right wheels, respectively, on said front axle of said vehicle, $\omega_1$ and $\omega_2$ are the angular velocities of said left and right wheels, respectively, on said front axle of said vehicle, $\omega_G$ is the yawing rate of said vehicle, S is the wheel gauge of said vehicle, and L is the wheel base dimension of said vehicle.

9. The process of claim 7, wherein a wheel radius ratio of the wheels on the rear axle of said vehicle is calculated in accordance with the following equation:

$$\frac{r_3}{r_4} = \frac{\omega_4}{\omega_3} \cdot \left(1 + \frac{\omega_G}{\omega_4} \cdot \frac{S}{r_4} \cdot (S_{4corr} + 1)\right) \cdot \frac{1}{1 - \frac{S_{3corr} - S_{4corr}}{S_{3corr} + 1}}$$

wherein $r_3$ and $r_4$ are the radii of the left and right wheels, respectively, on said rear axle of said vehicle, $\omega_3$ and $\omega_4$ are the angular velocities of said left and right wheels, respectively, on said rear axle of said vehicle, $\omega_G$ is the yawing rate of said vehicle, $S_{3corr}$ and $S_{4corr}$ are the corrected drive slip values of said left and right wheels, respectively, on said rear axle of said vehicle, S is the wheel gauge of said vehicle, and L is the wheel base dimension of said vehicle.

10. The process of claim 9, wherein said wheel radius ratios $r_1/r_2$, $r_1/r_3$, $r_2/r_4$, $r_3/r_4$ are monitored continuously, such that a change in said wheel radius ratios caused by a particular one of said wheels is indicative of an unacceptable tire pressure in said particular one of said wheels.

11. The process of claim 10, wherein said change in said wheel radius ratios must exceed a predetermined threshold level in order to indicate an unacceptable tire pressure.

12. The process of claim 11, wherein a warning signal is generated when said unacceptable tire pressure is detected.

13. The process of claim 1, wherein said calculation of said drive slip with compensation for both curve travel and slip angle, is in accordance with the following equation:

$$S'_A = \frac{r_A \cdot \omega_A \cdot \cos\alpha_V}{r_V \cdot \omega_V \cdot \cos\left(\arcsin\left(\frac{L}{r_V} \cdot \frac{\omega_G}{\omega_V} \cdot \cos\alpha_A \cdot \cos\alpha_V\right) - \alpha_A\right)} - 1$$

wherein $S_A'$ is the drive slip corrected for curve travel and slip angle, $\omega_V$ and $r_V$ are the angular velocity and radius, respectively, of a front wheel of said vehicle, $\omega_A$ and $r_A$ are the angular velocity and radius, respectively, of a rear wheel of said vehicle, L is the wheel base dimension of said vehicle, $\omega_G$ is the yawing rate of said vehicle, and $\alpha_V$ and $\alpha_A$ are the front and rear slip angles, respectively, of said wheels of said vehicle.

* * * * *

UNITED STATES PATENT AND TRADEMARK OFFICE
CERTIFICATE OF CORRECTION

PATENT NO. : 6,644,105 B2
DATED : November 11, 2003
INVENTOR(S) : Thomas Dieckmann et al.

It is certified that error appears in the above-identified patent and that said Letters Patent is hereby corrected as shown below:

Column 5,
Line 35, the formula should be -- $S_A = \dfrac{\omega_A}{\omega_{F'}} \cdot \dfrac{r_A}{r_{F'}} \cdot \sqrt{\dfrac{1}{1 - \dfrac{L^2}{r_{F'}^2} \cdot \dfrac{\omega_G^2}{\omega_{F'}^2}} - 1}$ -- and not " $S_A = \dfrac{\omega_A}{\omega_A} \cdot \dfrac{r_A}{r_{F'}} \cdot \sqrt{\dfrac{1}{1 - \dfrac{L^2}{r_{F'}^2} \cdot \dfrac{\omega_G^2}{\omega_{F'}^2}} - }$ "

Signed and Sealed this

Sixteenth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,644,105 B2
DATED         : November 11, 2003
INVENTOR(S)   : Thomas Dieckmann et al.

It is certified that error appears in the above-identified patent and that said Letters Patent is hereby corrected as shown below:

Column 5,
Line 35, the formula should be -- $S_A' = \dfrac{\omega_A}{\omega_V} \cdot \dfrac{r_A}{r_V} \cdot \sqrt{\dfrac{1}{1 - \dfrac{L^2}{r_V^2} \cdot \dfrac{\omega_G^2}{\omega_V^2}}} - 1$ --

Signed and Sealed this

Thirty-first Day of August, 2004

JON W. DUDAS
*Director of the United States Patent and Trademark Office*